F. W. BLOCH.
COATING COMPOSITION FOR KITCHEN UTENSILS.
APPLICATION FILED SEPT. 19, 1918. RENEWED DEC. 12, 1919.
1,328,556.
Patented Jan. 20, 1920.
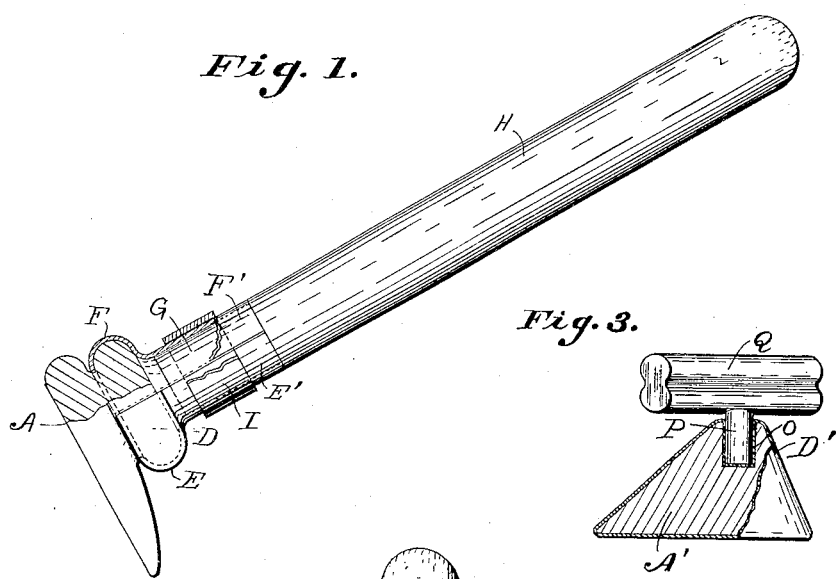
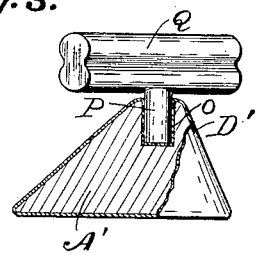
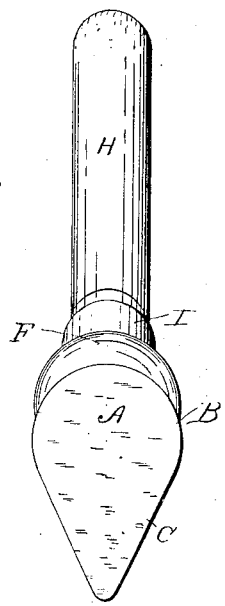
Inventor
Flora W. Bloch
By Erwin & Wheeler
Attorneys
Witness

UNITED STATES PATENT OFFICE.

FLORA W. BLOCH, OF MILWAUKEE, WISCONSIN.

COATING COMPOSITION FOR KITCHEN UTENSILS.

1,328,556.   Specification of Letters Patent.   Patented Jan. 20, 1920.

Application filed September 19, 1918, Serial No. 254,868. Renewed December 12, 1919. Serial No. 344,468.

*To all whom it may concern:*

Be it known that I, FLORA W. BLOCH, a citizen of the United States, residing at Milwaukee, county of Milwaukee, and State of Wisconsin, have invented new and useful Improvements in Coating Compositions for Kitchen Utensils, of which the following is a specification.

My invention relates to improvements in anti-rust compositions for kitchen utensils and tools for applying the same.

The object of my invention is to provide means for coating the surfaces of metal utensils with a material which will not become rancid, but which will effectually coat the surface of the metal to prevent adhesion of the contents of the vessel during the cooking or baking processes.

My invention resides in the discovery that a composition of bees-wax and either animal or vegetable fat, or oil, if mixed in proper proportions, will serve the desired purpose. The bees-wax prevents the fat, particularly where animal fat is used, from becoming rancid, and it also imparts a desired consistency to the mass, whereby it will not melt too rapidly when applied to a warm dish, and whereby it may be molded to form a block, of such contour that it may readily be applied in angles and corners of cooking vessels as well as over flat or rounded surfaces. Owing to the presence of the bees-wax in the composition, the block of material has sufficient firmness to enable it to be clamped within or upon a suitable holder which facilitates manipulating the material over the surfaces of a cooking vessel. The animal or vegetable oil, (fat), in the composition causes it to spread more readily over the surfaces in the form of a thin coating, whereas bees-wax alone would require to be melted in order to distribute it, and when melted it would be difficult to distribute it evenly in the form of a thin coating. My improved composition distributes more readily when the vessel to which it is applied is warm, but heat is not essential.

In the drawings:—

Figure 1 is an elevation of a tool to which my composition has been secured in the form of a block having the lower surface of a generally triangular form.

Fig. 2 is a bottom view of a block formed of my improved composition, and contoured to fit cooking vessels of various forms or shapes.

Fig. 3 is a detail view, partly in section, showing a modified form of holder.

Like parts are identified by the same reference characters throughout the several views.

My improved composition comprises a mixture of bees-wax and a suitable lubricant, such as animal fat or oil, or vegetable oil, such, for example, as corn oil, heavy oils being preferred. These are mixed together while heated sufficiently to liquefy both the bees-wax and the oil, or fat. For corn oil I preferably employ a mixture of about equal parts of bees-wax and oil, provided a thick corn oil is used. For thinner grades of corn oil the proportion of bees-wax may be increased.

Similarly, the proportion of bees-wax to animal fat or oil may be varied in accordance with the consistency of the lubricant employed. It will, of course, be understood that the lubricant, whether an animal or vegetable product, will be fit for human consumption, no rancid fats or oils being employed. The block of material may be formed by pouring the heated mixture into a suitable mold, and allowing it to cool. If the block is not sufficiently solid to allow it to be secured to a holder by means of an ordinary clamp, additional bees-wax may be used, the hardness of the block increasing in direct proportion to the increase in the quantity of bees-wax.

Referring to the drawings, it will be observed that my improved composition is cast in the form of a block having a flat base A elongated and tapered to form a point, the opposite end being rounded substantially in the arc of a circle, as indicated at B. The sides C of the tapered portion are preferably straight. The point will fit into the corners or angles of baking tins, and the rounded surface may be applied to curved surfaces of various cooking vessels. The straight edges along the sides of the tapered portion facilitate manipulating the block in the angles formed by the junction of the sides of a straight sided vessel with the bottom.

The upper surface of the block is preferably cast in the form of a specifically rounded projection D, whereby it may be engaged between the two halves of a clamping sphere or spherically rounded member E and F respectively, these members E and F being provided with semi-cylindrical shanks E' and F', adapted to embrace the reduced lower end G of a handle H. A ring I is slidably mounted upon the handle, and adapted, when moved downwardly, to embrace and secure the cylindrical shanks of the clamping members to the reduced portion of the handle. By moving the ring upwardly, however, these shanks may be released, thereby releasing the spherically rounded portion of the block, whereby blocks of the composition may readily be removed and replaced.

In the construction shown in Fig. 1, and also in the construction shown in Fig. 3, the lubricating block is illustrated with a covering M of suitable fabric, which quickly becomes impregnated with the composition when the latter is heated, and particularly when it is subjected to pressure. Any suitable piece of cotton cloth may be employed. The cloth assists in maintaining the contour of the block, and also retards the distribution of the lubricant, whereby a thinner coating may be applied, and a more uniform coating obtained than would otherwise be possible.

In Fig. 3, the block A', composed of the composition, is provided with a conical upper portion D', having a socket O in the upper surface adapted to receive a projection P of a handle Q. The fabric is gathered around this conical portion and tucked into the socket by projection P, the latter being bound in the socket and held by frictional contact.

I claim:—

1. A composition for coating cooking vessels, comprising a mixture of digestible lubricant adapted for human consumption, with a sufficient quantity of bees wax to solidify the mixture, and maintain it in solidified form at normal temperatures.

2. A composition for coating cooking vessels, comprising a mixture of bees wax and vegetable oil in substantially equal proportions.

In testimony whereof I affix my signature in the presence of two witnesses.

FLORA W. BLOCH.

Witnesses:
  LEVERETT C. WHEELER,
  O. C. WEBER.